(12) United States Patent
Osakabe et al.

(10) Patent No.: US 9,025,221 B2
(45) Date of Patent: May 5, 2015

(54) SHEET CONVEYING DEVICE AND IMAGE READING APPARATUS

(71) Applicants: Yoshinori Osakabe, Seto (JP); Muneaki Takahata, Toyoake (JP)

(72) Inventors: Yoshinori Osakabe, Seto (JP); Muneaki Takahata, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/227,609

(22) Filed: Mar. 27, 2014

(65) Prior Publication Data
US 2014/0293379 A1 Oct. 2, 2014

(30) Foreign Application Priority Data

Mar. 29, 2013 (JP) .................................. 2013-072751

(51) Int. Cl.
*H04N 1/04* (2006.01)
*H04N 1/00* (2006.01)
*H04N 1/12* (2006.01)
*H04N 1/193* (2006.01)

(52) U.S. Cl.
CPC ......... *H04N 1/00588* (2013.01); *H04N 1/0053* (2013.01); *H04N 1/00535* (2013.01); *H04N 1/00628* (2013.01); *H04N 1/00633* (2013.01); *H04N 1/12* (2013.01); *H04N 1/193* (2013.01); *H04N 2201/0081* (2013.01)

(58) Field of Classification Search
CPC ............ H04N 1/00588; H04N 1/0053; H04N 1/00535; H04N 1/00628; H04N 1/00633; H04N 1/12; H04N 1/193; H04N 2201/0081
USPC .................................. 358/498, 497, 474, 496
See application file for complete search history.

(56) References Cited

U.S. PATENT DOCUMENTS

2005/0058480 A1* 3/2005 Ohashi et al. .................... 400/55
2010/0328737 A1* 12/2010 Shingai .......................... 358/498

FOREIGN PATENT DOCUMENTS

JP   H06-321375 A   11/1994
JP   2009-161282 A   7/2009
JP   2011-068433 A   4/2011

* cited by examiner

*Primary Examiner* — Houshang Safaipour
(74) *Attorney, Agent, or Firm* — Banner & Witcoff, Ltd.

(57) ABSTRACT

A sheet conveying device including: a separating roller; a separating piece; and conveying rollers. The separating roller conveys each sheet along a predetermined conveying path in a conveyance direction. The separating piece provides a first nip position in cooperation with the outer peripheral surface of the separating roller for nipping a sheet or sheets therebetween. The conveying rollers are provided at positions downstream of the separating roller in the conveyance direction and provide a second nip position where the sheet is nipped therebetween for conveying the sheet conveyed by the separating roller in the conveyance direction. An imaginary flat plane is defined by connecting the first nip position and the second nip position. The separating piece has a portion positioned downstream of the first nip position and protruding toward the separating roller beyond the imaginary flat plane.

10 Claims, 7 Drawing Sheets

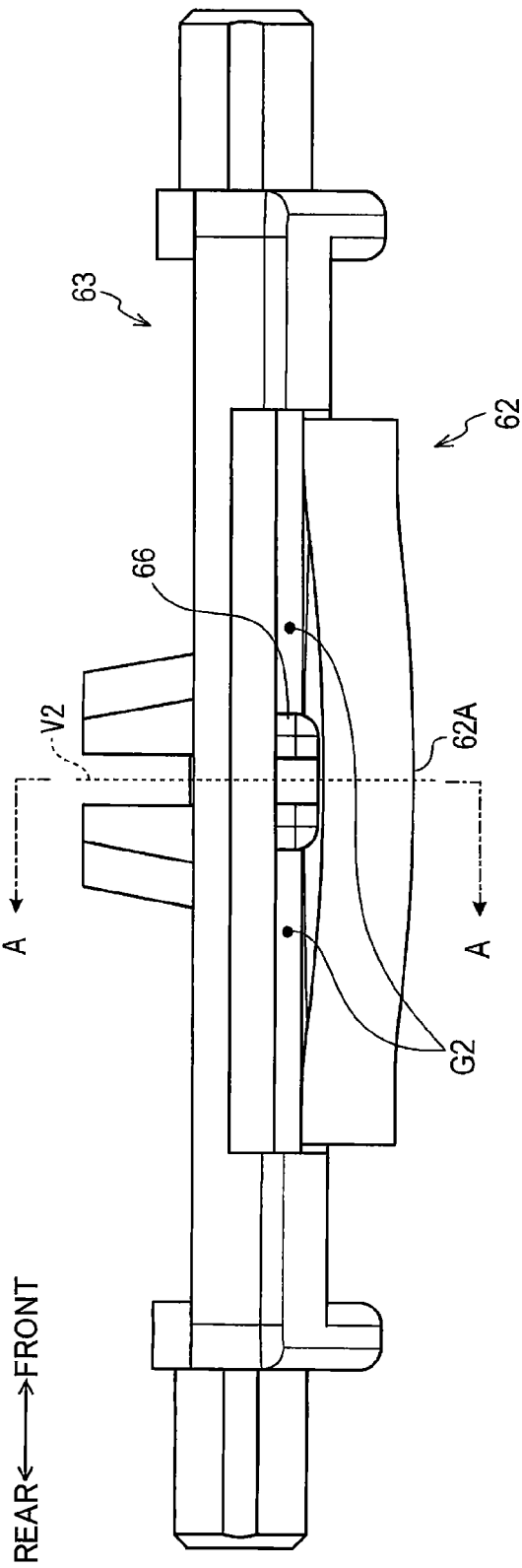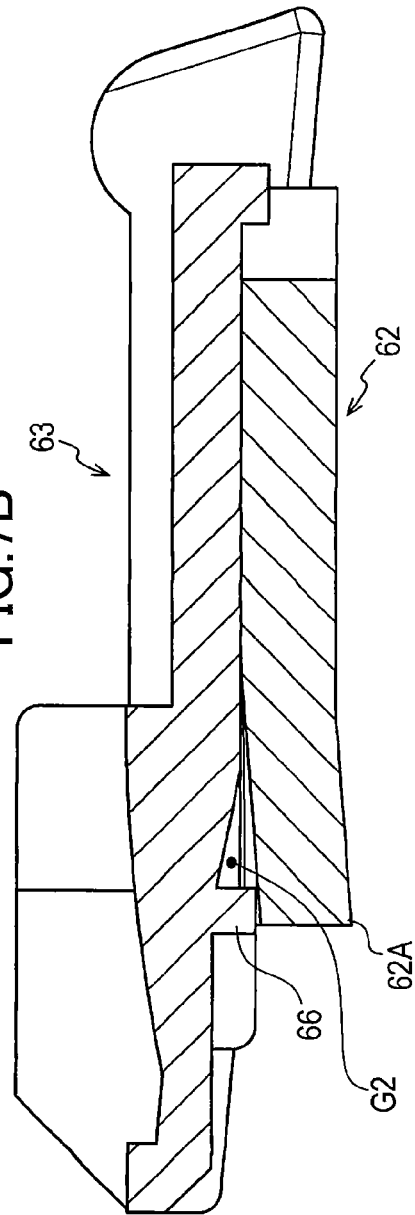

SHEET CONVEYING DEVICE AND IMAGE READING APPARATUS

CROSS REFERENCE TO RELATED APPLICATION

This application claims priority from Japanese Patent Application No. 2013-072751 filed Mar. 29, 2013. The entire content of the priority application is incorporated herein by reference.

TECHNICAL FIELD

The present invention relates to a sheet conveying device and an image reading apparatus.

BACKGROUND

Conventionally, there is known, as a separating mechanism provided in a sheet conveying device, one having a separating roller and a separating piece. The separating roller rotates while contacting a sheet. The separating piece contacts the sheet at a side opposite to a side where the separating roller contacts the sheet to apply conveyance resistance to the sheet.

In general, such a conventional sheet conveying device has a plurality of conveying rollers including the above-described separating roller. The plurality of conveying rollers is driven to rotate to convey the sheet along a predetermined conveying path. The sheet nipped between the separating roller and the separating piece (i.e., nip position) is fed downstream in a conveyance direction of the sheet as the separating roller rotates. Then, a leading end portion of the sheet in the conveyance direction is nipped between a pair of conveying rollers that is positioned downstream of the separating roller in the conveyance direction. Thereafter, when the sheet is further fed downstream in the conveyance direction as the separating roller and the pair of conveying rollers rotate, a trailing end portion of the sheet in the conveyance direction separates from the nip position between the separating roller and the separating piece.

SUMMARY

However, in the sheet conveying device described above, the conveyance resistance applied to the sheet by the separating roller and the separating piece stops acting on the sheet upon separation of the trailing end portion of the sheet from the nip position between the separating roller and the separating piece. Thus, a force acting on the sheet becomes imbalanced at the instant of separation of the sheet from the nip position, sometimes causing a sheet conveying speed to increase for an instant.

Assuming that the above-described sheet conveying device is provided in an image reading apparatus, if the sheet conveying speed increases for an instant during an image reading operation, an image read during the image reading operation is slightly compressed in a sub scanning direction, leading to image degradation.

Further, assuming that the above-described sheet conveying device is provided in an image forming apparatus, if the sheet conveying speed increases for an instant during an image forming operation, an image formed during the image forming operation is slightly expanded in a sub scanning direction, leading to image degradation.

In view of the foregoing, it is an object of the present invention to provide a sheet conveying device capable of preventing a sheet conveying speed from increasing for an instant upon separation of a sheet from a nip position between a separating roller and a separating piece.

In order to attain the above and other objects, the present invention provides a sheet conveying device configured to convey sheets in a conveyance direction along a predetermined conveying path including: a separating roller; a separating piece; and a pair of conveying rollers. The separating roller has an outer peripheral surface and is configured to convey each sheet along the predetermined conveying path in the conveyance direction. The separating piece is configured to provide a first nip position in cooperation with the outer peripheral surface of the separating roller for nipping a sheet or sheets therebetween. The separating piece is configured to separate the sheets one by one in cooperation with the separating roller. The pair of conveying rollers is provided at a position downstream of the separating roller in the conveyance direction. The pair of conveying rollers is configured to provide a second nip position where the sheet is nipped therebetween for conveying the sheet conveyed by the separating roller in the conveyance direction. An imaginary flat plane is defined by connecting the first nip position and the second nip position. The separating piece has a portion positioned downstream of the first nip position. The portion of the separating piece protrudes toward the separating roller beyond the imaginary flat plane.

According to another aspect, the present invention provides an image reading apparatus including: a sheet conveying unit; and a reading unit. The sheet conveying unit is configured to convey sheets in a conveyance direction along a predetermined conveying path. The reading unit is configured to read an image from a sheet conveyed by the sheet conveying unit. The sheet conveying unit including: a separating roller; a separating piece; and a pair of conveying rollers. The separating roller has an outer peripheral surface and is configured to convey each sheet along the predetermined conveying path in the conveyance direction. The separating piece is configured to provide a first nip position in cooperation with the outer peripheral surface of the separating roller for nipping a sheet or sheets therebetween. The separating piece is configured to separate the sheets one by one in cooperation with the separating roller. The pair of conveying rollers is provided at a position downstream of the separating roller in the conveyance direction. The pair of conveying rollers is configured to provide a second nip position where the sheet is nipped therebetween for conveying the sheet conveyed by the separating roller in the conveyance direction. An imaginary flat plane is defined by connecting the first nip position and the second nip position. The separating piece has a portion positioned downstream of the first nip position. The portion of the separating piece protrudes toward the separating roller beyond the imaginary flat plane.

BRIEF DESCRIPTION OF THE DRAWINGS

In the drawings;

FIG. 7A is a view illustrating the separating piece and the separating piece holder as viewed from a downstream side in a conveyance direction of a document sheet; and FIG. 7B is a cross-sectional view illustrating the separating piece and the separating piece holder taken along a line A-A in FIG. 7A.

DETAILED DESCRIPTION

Figure 1:
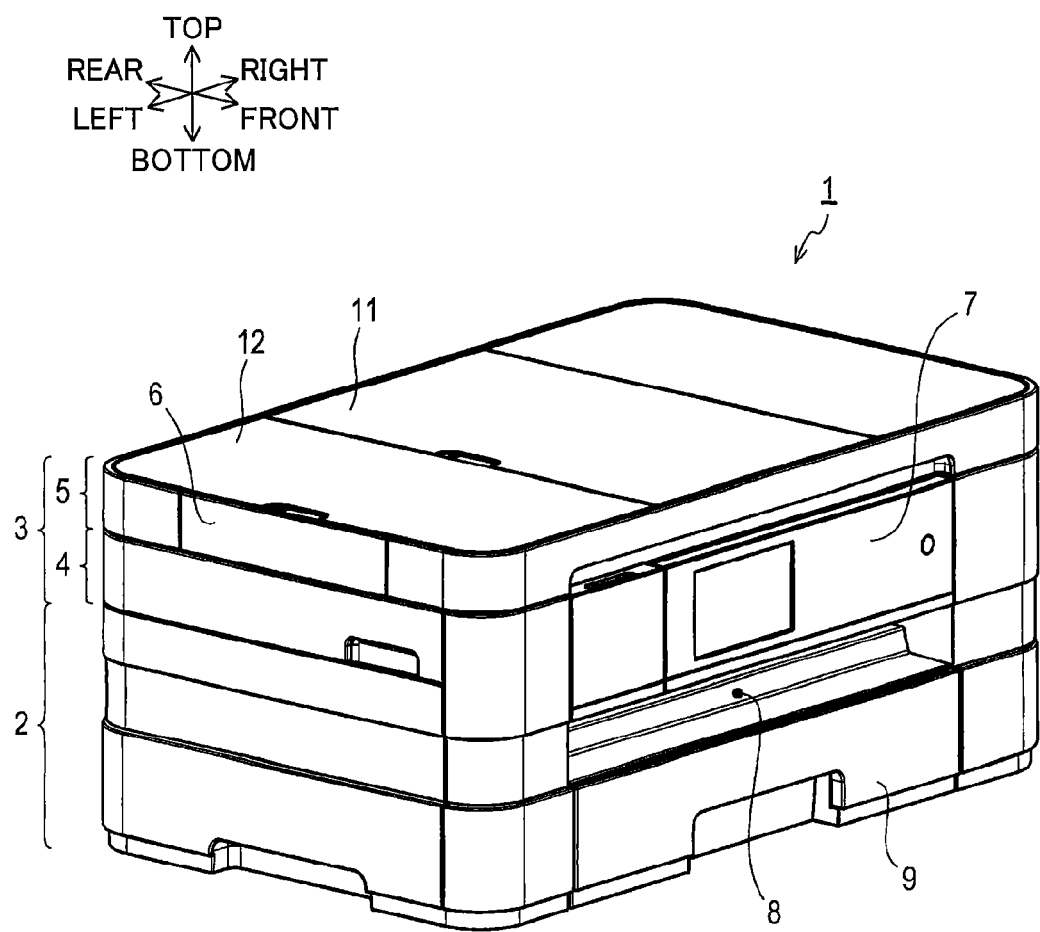
FIG. 1 is a perspective view of a multifunction apparatus according to one embodiment of the present invention.
Figure 2:
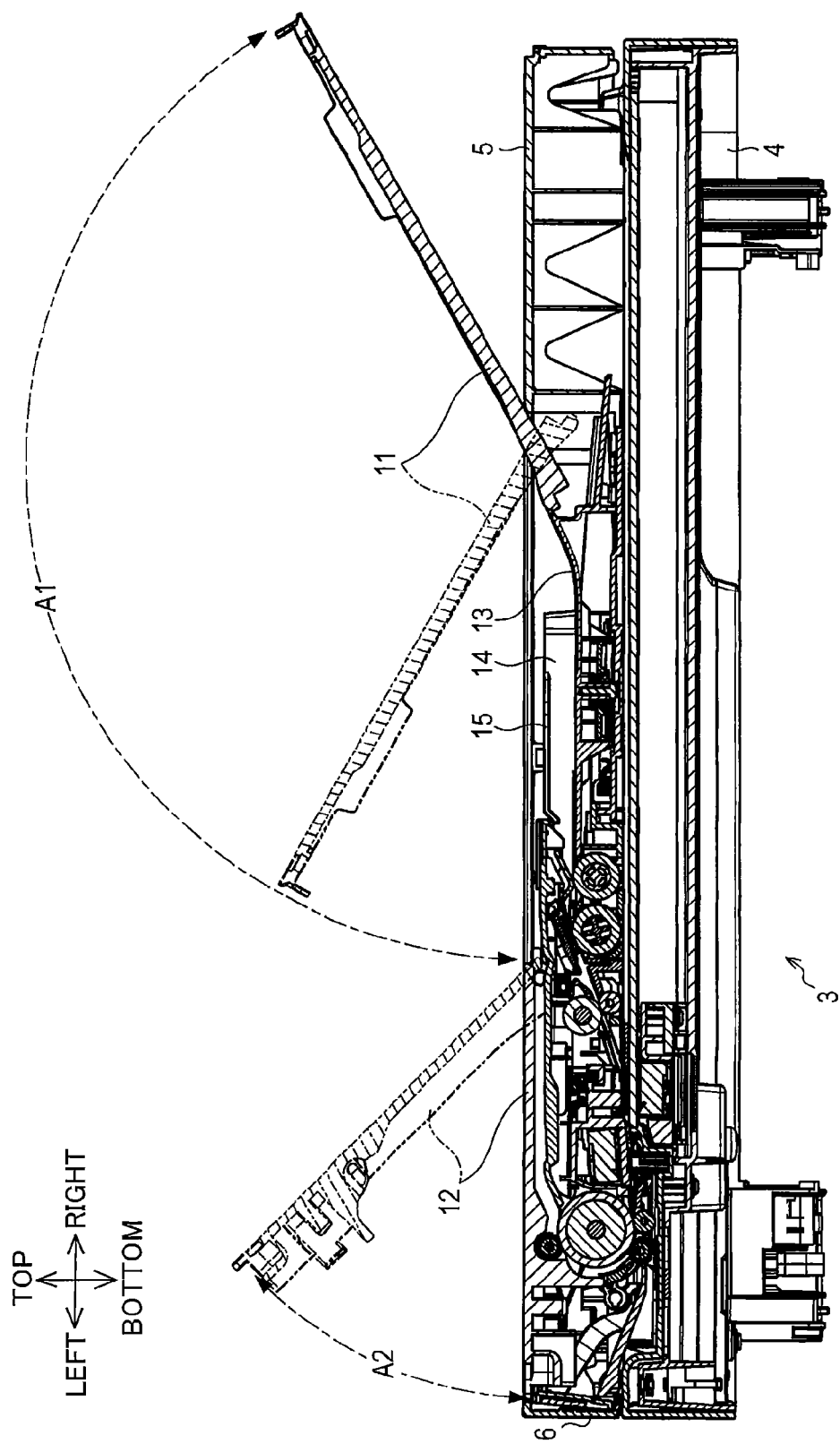
FIG. 2 is a vertical cross-sectional view illustrating inner structures of a FB (flat-bed) section and an ADF (automatic document feeder) section.

A general structure of a multifunction apparatus will be described with reference to FIGS. 1 and 2. The multifunction apparatus 1 shown in FIG. 1 includes an upper unit 3 as an image reading apparatus according to one embodiment of the present invention, and a detailed structure of the upper unit 3 including an automatic document feeder section 5 as a sheet conveying device according to the embodiment of the present invention will be described later while referring to FIGS. 3 to 7B.

Throughout the specification, in order to clearly describe a relative positional relationship among components of the multifunction apparatus 1, the terms "upward", "downward", "upper", "lower", "above", "below", "beneath", "right", "left", "front", "rear" and the like will be used assuming that the multifunction apparatus 1 is disposed in an orientation in which it is intended to be used. More specifically, in FIG. 1, a side of the multifunction apparatus 1 where an operation panel 7 is provided will be referred to as a front side of the multifunction apparatus 1, and hence, left, right, rear, top, and bottom sides of the multifunction apparatus 1 will be based on the perspective of a user facing the operation panel 7 of the multifunction apparatus 1. Directions related to the multifunction apparatus 1 in FIGS. 2 through 7B will be given based on the directions related to the multifunction apparatus 1 in FIG. 1.

<General Structure of Multifunction Apparatus>

The multifunction apparatus 1 has various functions (a print function, a copy function, a facsimile function, etc.) in addition to a scan function. As illustrated in FIG. 1, the multifunction apparatus 1 includes a lower unit 2 and the upper unit 3 mounted on the lower unit 2. The lower unit 2 accommodates therein an image forming section (not illustrated), a controller (not illustrated), a power supply section (not illustrated), and the like. The upper unit 3 is mounted to the lower unit 2 so as to be pivotally movable relative to the lower unit 2 about its pivot axis extending in a left-right direction at a rear side in the multifunction apparatus 1. The upper unit 3 can be moved, in association with its pivotal movement, between a closed position that covers an upper opening of the lower unit 2 and an open position that exposes the upper opening of the lower unit 2 to the outside.

The upper unit 3 has a structure in which an automatic document feeder (hereinafter, abbreviated as "ADF") is incorporated in a cover part of a flat-bed (hereinafter, abbreviated as "FB") image scanner. The upper unit 3 includes an FB section 4, and an ADF section 5 that covers an upper surface of the FB section 4.

The ADF section 5 is mounted to the FB section 4 so as to be pivotally movable relative to the FB section 4 about its pivot axis extending in the left-rear direction. That is, the pivot axis of the ADF section 5 extends in a direction parallel to the extending direction of the pivot axis of the upper unit 3. The ADF section 5 can be moved, in association with its pivotal movement, between a closed position that covers the upper surface of the FB section 4 and an open position that exposes the upper surface of the FB section 4 to the outside. The upper surface of the FB section 4 serves as a document placement surface.

A side cover 6 is provided at a left side wall of the ADF section 5. The side cover 6 is pivotally movable about its lower end portion and can thus be moved between an open position and a closed position. The upper unit 3 is an example of an image reading apparatus, and the ADF section 5 is an example of a sheet conveying device.

The operation panel 7 that is operated by a user is provided at an upper portion of a front wall of the lower unit 2. An outlet port 8 through which a recording medium on which an image has been formed is discharged is formed below the operation panel 7. A sheet cassette 9 is attached to the lower unit 2 at a position below the outlet port 8. A recording medium on which an image has not yet been formed is accommodated in the sheet cassette 9.

A first upper cover 11 and a second upper cover 12 are provided at an upper wall of the ADF section 5. As denoted by an arrow A1 in FIG. 2, the first upper cover 11 is pivotally movable relative to the upper wall of the ADF section 5 about a pivot axis extending in a front-rear direction at a right end portion of the first upper cover 11. Similarly, as denoted by an arrow A2 in FIG. 2, the second upper cover 12 is pivotally movable relative to the upper wall of the ADF section 5 about a pivot axis extending in the front-rear direction at a right end portion of the second upper cover 12.

When being located at its closed position, the first upper cover 11 is in such a state that a portion thereof extending leftward from its pivot axis covers a sheet passing surface 13 positioned below the first upper cover 11. When pivotally moved to be located at its open position, the first upper cover 11 extends obliquely in an upper-right direction from its pivot axis to constitute a document placement section together with the sheet passing surface 13.

A pair of side guides 14 is provided on the sheet passing surface 13. The side guides 14 are configured to be slidable in the front-rear direction such that they are moved in opposite directions. More specifically, the side guides 14 slidably moves together in the front-rear direction such that one of the side guides 14 moves forward as the other of the side guides 14 moves rearward. Therefore, when it is necessary to change an interval between the side guides 14, sliding only one side guide 14 allows both the side guides 14 to be brought close to or separated from each other.

Each of the side guides 14 has a partition plate 15. The respective partition plates 15 have a plate-like configuration extending, substantially horizontally, in opposite directions to each other from upper ends of the corresponding side guides 14. A document sheet (sheets) to be conveyed is set below the partition plates 15 and, in this state, the side guides 14 are made to abut against edge faces parallel to a conveyance direction of the document sheet to regulate the conveyance direction of the document sheet.

When the document sheet is conveyed along a first conveying path (described later), the conveyed document sheet is discharged above the partition plates 15 and then conveyed to an area ranging from the sheet passing surface 13 to the first upper cover 11. That is, in the multifunction apparatus 1, the area ranging from the first upper cover 11 to the sheet passing surface 13 is used as the document placement section on which the document sheet to be conveyed is placed and also as a discharge section to which the conveyed document sheet is discharged.

Similar to the first upper cover 11, when being located at its closed position, the second upper cover 12 is in such a state that a portion thereof extending leftward from its pivot axis covers an area located therebelow. When pivotally moved to be located at its open position, the second upper cover 12 exposes a document conveying path below the second upper cover 12 to the outside. In this state, an operation for removing a document sheet jammed in the document conveying path below the second upper cover 12 can be carried out.

<Detailed Description of Upper Unit>

Next, the upper unit 3 will be described in greater detail.

Figure 3:
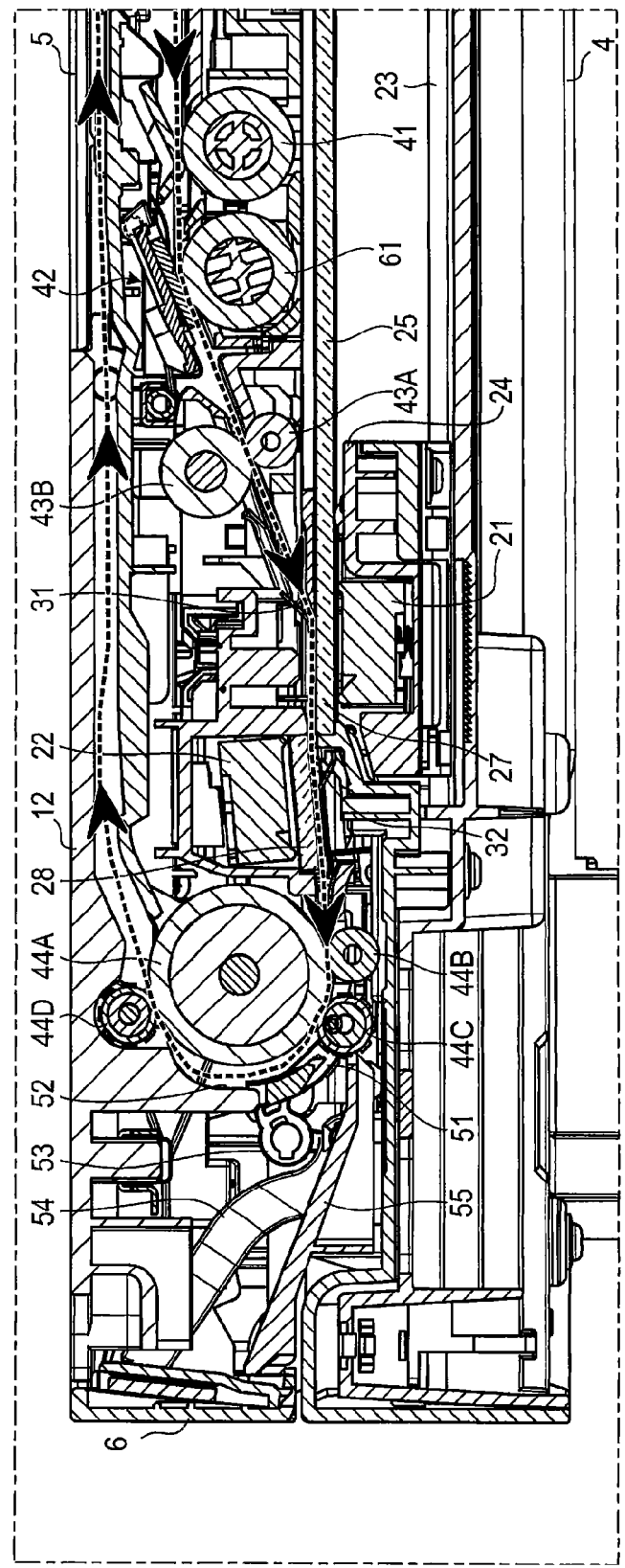
FIG. 3 is an enlarged vertical cross-sectional view illustrating the inner structures of the FB section and the ADF section at positions adjacent to a side cover that is in its closed state.
Figure 4:
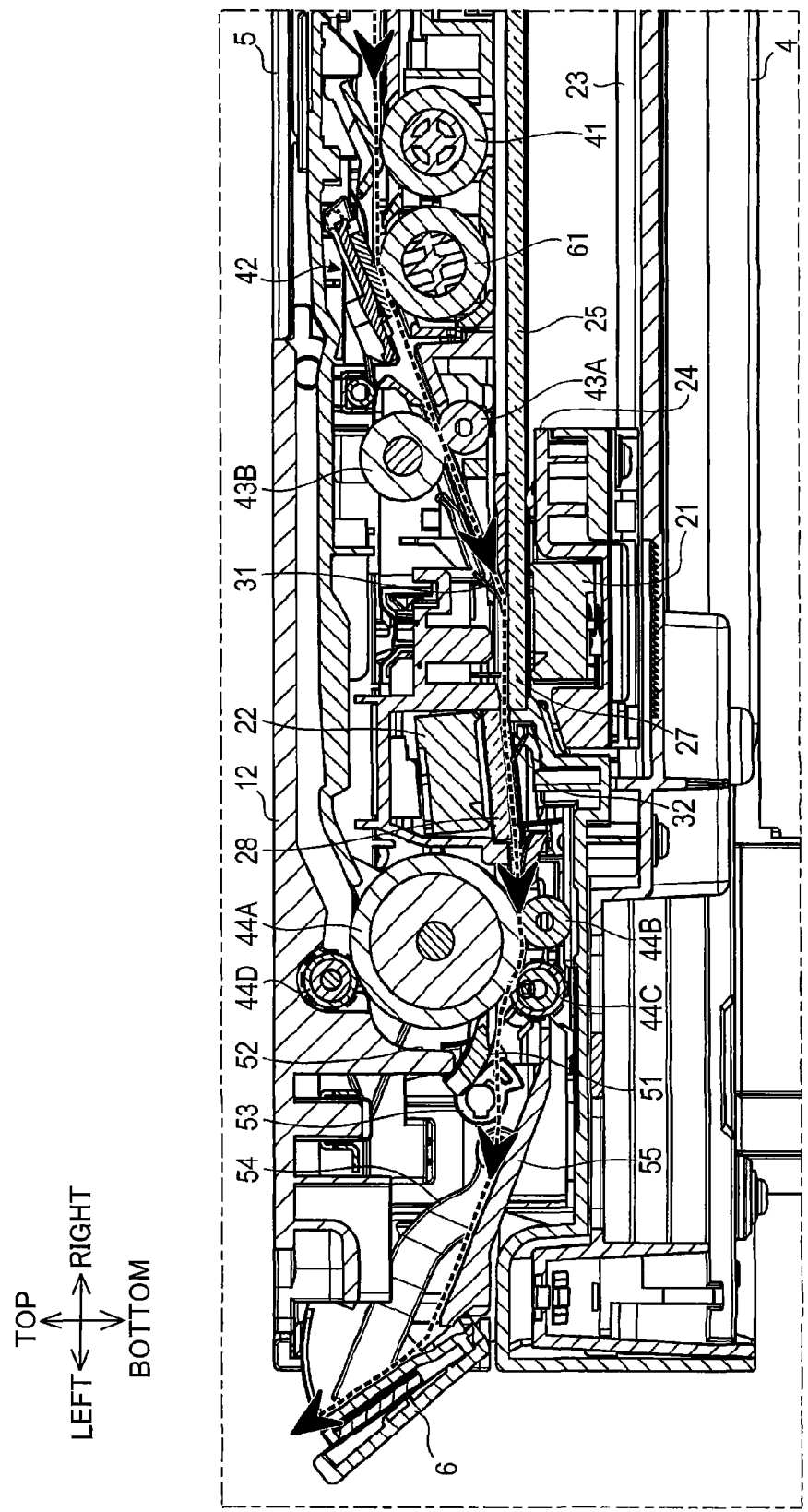
FIG. 4 is an enlarged vertical cross-sectional view illustrating the inner structures of the FB section and the ADF section at positions adjacent to the side cover that is in its opened state.

As illustrated in FIGS. 3 and 4, the FB section 4 of the upper unit 3 has a first image sensor 21, and the ADF section 5 of the upper unit 3 has a second image sensor 22. A contact image sensor (CIS) is adopted as both the first and second image sensors 21 and 22.

The first image sensor 21 is mounted on a carriage 24. The carriage 24 can be moved along a guide rail 23 extending in the left-right direction. The carriage 24 is coupled to a timing belt (not illustrated) driven by a motor (not illustrated), whereby the first image sensor 21 together with the carriage 24 can move in a reciprocating manner inside the FB section 4 in the left-right direction. The first image sensor 21 reads an image from a document (document sheet) with a so-called FB method, while moving in a reciprocating manner inside the FB section 4. In reading an image from a document sheet with an ADF method, the image sensor 21 is stationary at a predetermined position to read the image from the document sheet.

The second image sensor 22 is used when images are read from both surfaces of a document sheet or one surface thereof with the ADF method. The second image sensor 22 is fixed to a frame inside the ADF section 5. In reading images from both surfaces of a document sheet with the ADF method, the images are read by using both the first and second image sensors 21 and 22, with the first image sensor 21 kept stationary at a predetermined position.

The FB section 4 is provided with a document support portion 25 and a first transparent portion 27 at positions above the reciprocating path of the first image sensor 21. The document support portion 25 supports a document (document sheet) to be read with the FB method. The first transparent portion 27 is a portion on which a document sheet to be read with the ADF method passes. The ADF section 5 is provided with a second transparent portion 28 below which a document sheet to be read with the ADF method passes. The second transparent portion 28 is provided at a position below the second image sensor 22.

The document support portion 25 and the first transparent portion 27 are each located at a position serving as part of the upper surface of the FB section 4. In the present embodiment, the document support portion 25 and the first transparent portion 27 are constructed of a single glass plate. In the present embodiment, the second transparent portion 28 is constructed of a glass plate different from the glass plate constituting the document support portion 25 and the first transparent portion 27.

The document support portion 25 and the first transparent portion 27 may be separately constructed of different glass plates. Any material other than the glass may be used for the document support portion 25, the first transparent portion 27, and the second transparent portion 28, as long as the material is transparent so as to allow the first and second image sensors 21 and 22 to read document sheets.

Further, the ADF section 5 is provided with a first document holder 31 that is disposed above the first transparent portion 27. The first document holder 31 is biased downward by a compression spring (not illustrated), whereby the first document holder 31 provides slight pressure on an upper surface of the first transparent portion 27.

Further, the FB section 4 is provided with a second document holder 32 that is disposed below the second transparent portion 28. The second document holder 32 is biased upward by a compression spring (not illustrated), whereby the second document holder 32 provides slight pressure on a lower surface of the second transparent portion 28.

The ADF section 5 is further provided with a supply roller 41, a separating mechanism 42 including a separating roller 61 (described later), a pair of conveying rollers 43A and 43B, a plurality of U-turn conveying rollers 44A, 44B, 44C and 44D. Guide members each providing guide surfaces for guiding the document sheet properly in the conveyance direction are provided at positions among these rollers.

As two of such guide members providing the guide surfaces, a first guide member 51 and a second guide member 52 are provided in the ADF section 5 at positions leftward of the U-turn conveying roller 44A. The first guide member 51 is pivotally movable relative to a frame of the ADF section 5. The first guide member 51 can be moved, in association with its pivotal movement, between a first position illustrated in FIG. 3 and a second position illustrated in FIG. 4. On the other hand, the second guide member 52 is integrally formed with the second upper cover 12.

The ADF section 5 is further provided with a cam portion 53, an arm portion 54, and a chute portion 55 at positions leftward of the first guide member 51. The cam portion 53, the arm portion 54 and the side cover 6 constitute a four-bar linkage. The first guide member 51 is biased toward the cam portion 53 by a spring (not illustrated). The first guide member 51 is moved in a direction maintaining abutment with the cam portion 53, as the cam portion 53 angularly rotates.

More specifically, as illustrated in FIG. 3, when the side cover 6 is moved to the closed position, the cam portion 53 angularly rotates by a predetermined rotation angle in response to the closing movement of the side cover 6, thereby moving the first guide member 51 to the first position. On the other hand, as illustrated in FIG. 4, when the side cover 6 is moved to the open position, the cam portion 53 angularly rotates by the predetermined rotation angle in response to the opening movement of the side cover 6, thereby moving the first guide member 51 to the second position.

In a state where the first guide member 51 is located at the first position, the first conveying path is formed (see a path denoted by a dashed line in FIG. 3) in the ADF section 5. On the other hand, in a state where the first guide member 51 is located at the second position, a second conveying path is formed (see a path denoted by a dashed line in FIG. 4) in the ADF section 5. The second conveying path can convey the document sheet more linearly than the first conveying path.

<Description of Scanning Operation>

In the multifunction apparatus 1 with the above-described configuration, an image can be read from a document sheet while the document sheet is conveyed by the ADF section 5. In this case, a user moves the side cover 6 to selectively switch between the first conveying path and the second conveying path.

When a scanning operation is to be started, a scan command to start the scanning operation is given to the multifunction apparatus 1 by an operation on the operation panel 7 or a remote control from a PC (Personal Computer) (not illustrated). In this scan command, the user can arbitrarily specify single-side scan or double-side scan.

Upon receiving the scan command, the multifunction apparatus 1 activates the rollers provided in the ADF section 5. At this time, the supply roller 41 feeds, to the separating mechanism 42, the document sheets supplied from an upstream side in the conveyance direction, and the separating mechanism 42 separates the document sheets one at a time and conveys the separated document sheet to a downstream side in the conveyance direction.

Then, the pair of conveying rollers 43A and 43B conveys the document sheet to a position between the first transparent portion 27 and the first document holder 31. The document sheet thus passes between the first transparent portion 27 and the first document holder 31. When the double-side scan or the single-side scan by the first image sensor 21 is specified in the scan command, image-reading is performed by the first image sensor 21 when the document sheet reaches a position opposite to the first image sensor 21.

More specifically, the first image sensor 21 repeatedly reads a plurality of pixels arrayed in a main scanning direction (i.e. front-rear direction in the embodiment) on a line-by-line basis from the document sheet passing through the position opposite to the first image sensor 21 in a sub scanning direction (i.e. conveyance direction). Hence, the first image sensor 21 can read an image from a first surface (bottom surface) of the document sheet.

After having passed between the first transparent portion 27 and the first document holder 31, the document sheet passes between the second transparent portion 28 and the second document holder 32. When the double-side scan or the single-side scan by the second image sensor 22 is specified in the scan command, image-reading is performed by the second image sensor 22 when the document sheet reaches a position opposite to the second image sensor 22.

More specifically, the second image sensor 22 repeatedly reads a plurality of pixels arrayed in a main scanning direction (i.e. front-rear direction in the embodiment) on a line-by-line basis from the document sheet passing through the position opposite to the second image sensor 22 in a sub scanning direction (i.e. conveyance direction). Hence, the second image sensor 22 can read an image from a second surface (top surface) of the document sheet.

After having passed between the second transparent portion 28 and the second document holder 32, the document sheet reaches the U-turn conveying roller 44A. Subsequently, the document sheet is conveyed leftward of the U-turn conveying roller 44A from a bottom side of the U-turn conveying roller 44A.

When the first conveying path is selected (see FIG. 3) by closing the side cover 6, the first guide member 51 is located at the first position to serve as a partitioning wall for partitioning a space existing at left and right sides of the first guide member 51 into a left-side space located at the left side of the first guide member 51 and a right-side space located at the right side of the first guide member 51. In this state, a concave surface constituting a right side surface of the first guide member 51 (in a state shown in FIG. 3) is disposed at a position along an outer peripheral surface of the U-turn conveying roller 44A. The concave surface of the first guide member 51 serves as a guide surface for guiding a leading end portion of the document sheet upward when the document sheet is conveyed leftward from the bottom side of the U-turn conveying roller 44A.

The document sheet guided upward along the guide surface is U-turned along the outer peripheral surface of the U-turn conveying roller 44A. That is, the document sheet is conveyed along the first conveying path. The document sheet conveyed along the first conveying path is discharged to an upper wall side of the ADF section 5. More specifically, the document sheet conveyed along the first conveying path is discharged above the partition plates 15 (illustrated in FIG. 2) of the ADF section 5.

On the other hand, when the second conveying path is selected (see FIG. 4) by opening the side cover 6, the first guide member 51 is located at the second position. The first guide member 51 at the second position provides communication between the left-side space and the right-side space. When the document sheet is conveyed leftward from the bottom side of the U-turn conveying roller 44A in this state, the leading end portion of the document sheet passes below the first guide member 51.

As a result, the document sheet is conveyed toward the side cover 6 along the second conveying path. Hence, the user determines which of the first and second conveying paths is selected, depending on size and thickness of the document sheet to be read. When the user selects the second conveying path, he or she moves the side cover 6 to its open position so as to allow the first guide member 51 to be moved to the second position.

Further, in the multifunction apparatus 1, an image of the document (document sheet) placed on the document support portion 25 can be read. In this case, the ADF section 5 is moved to its open position, and the document is placed on the document support portion 25 serving as the document placement surface. In this state, the scan command is given to the multifunction apparatus 1 by the operation on the operation panel 7 or the remote control from the PC (not illustrated).

Upon receiving the scan command, the multifunction apparatus 1 initializes each component of the multifunction apparatus 1 and then performs image-reading using the first image sensor 21. More specifically, the first image sensor 21 repeatedly reads a plurality of pixels arrayed in a main scanning direction (i.e. front-rear direction in the embodiment) on a line-by-line basis from the document placed on the document support portion 25, while moving in a sub scanning direction (i.e. left-right direction in the embodiment) together with the carriage 24. Hence, the first image sensor 21 can read an image from the document placed on the document support portion 25.

<Detailed Description of Separation Mechanism>

Figure 5:
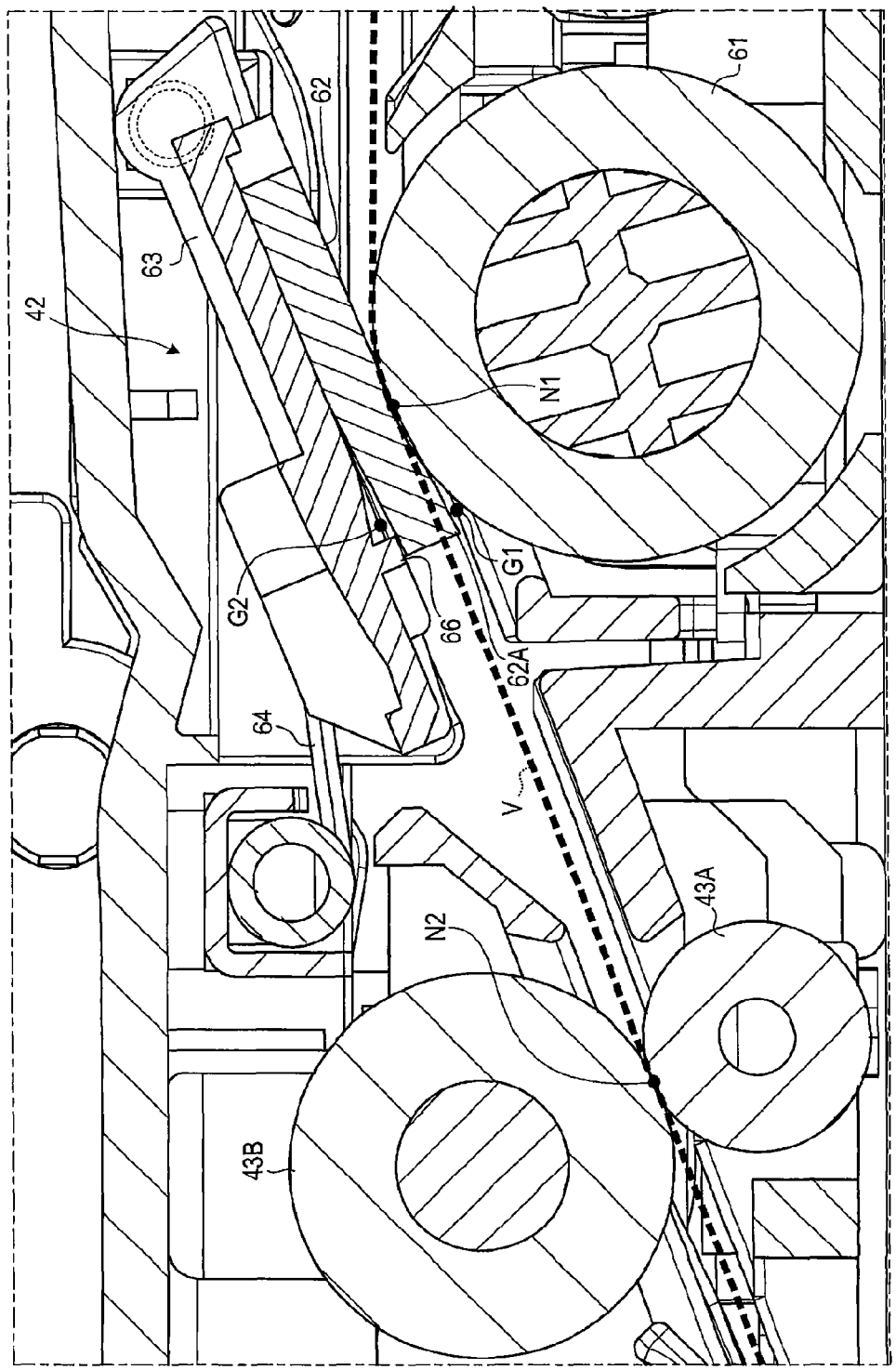
FIG. 5 is an enlarged vertical cross-sectional view illustrating the inner structure of the ADF section at a position around a separating roller.

As illustrated in FIG. 5, the separating mechanism 42 includes the separating roller 61, a separating piece 62, a separating piece holder 63, and a torsion coil spring 64.

The separating roller 61 rotates while contacting, at its outer peripheral surface, the document sheets supplied from the upstream side in the conveyance direction and feeds the document sheet located at a position contacting the separating roller 61 to the downstream side in the conveyance direction.

The separating piece 62 is provided at a position nipping the document sheets in cooperation with the separating roller 61. The separating piece 62 is adapted to apply conveyance resistance to the document sheets to prevent the document sheets other than the document sheet located at the position contacting the separating roller 61 from being fed to the downstream side in the conveyance direction. In other words, when a first document sheet and a second document sheet are conveyed, superposed with each other, and when the first document sheet is in contact with the separating roller 61 and the second document sheet is in contact with the separating piece 62, the separating piece 62 is adapted to apply conveyance resistance to the second document sheet for preventing the second document sheet from being conveyed together with the first document sheet.

The separating piece 62 contacts the document sheet at a front-rear center portion of the document sheet. In other words, the separating piece 62 contacts the document sheet at a center portion of the document sheet in a widthwise direction. A direction parallel to the top and bottom surfaces of the document sheet and perpendicular to the conveyance direction of the document sheet is referred to as the widthwise direction. In this embodiment, the widthwise direction is the front-rear direction. The top and bottom surfaces of the document sheet are surfaces from which images are to be read. The top and bottom surfaces of the document sheet are also surfaces to be brought into contact with the separating piece 62 and the separating roller 61, respectively, when the document sheet is passing between the separating piece 62 and the separating roller 61. Hence, the widthwise direction is also a direction parallel to the surface of the document sheet contacting the separating roller 61 and perpendicular to the conveyance direction of the document sheet.

The separating piece holder 63 retains the separating piece 62. The separating piece holder 63 is pivotally movably supported to a frame of the ADF section 5 at a position opposite to the separating roller 61 with respect to the separating piece 62. The torsion coil spring 64 is a resilient member (biasing member) that biases the separating piece holder 63 toward the separating roller 61. The separating piece 62 is pressed toward the separating roller 61 by the separating piece holder 63.

Figure 6A:
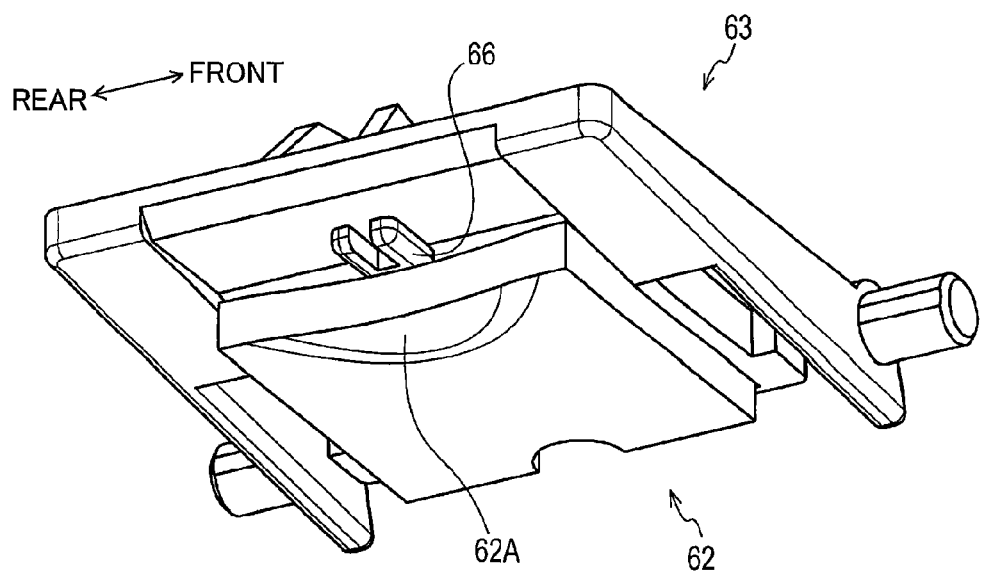
FIG. 6A is a perspective view illustrating a separating piece and a separating piece holder.
Figure 6B:
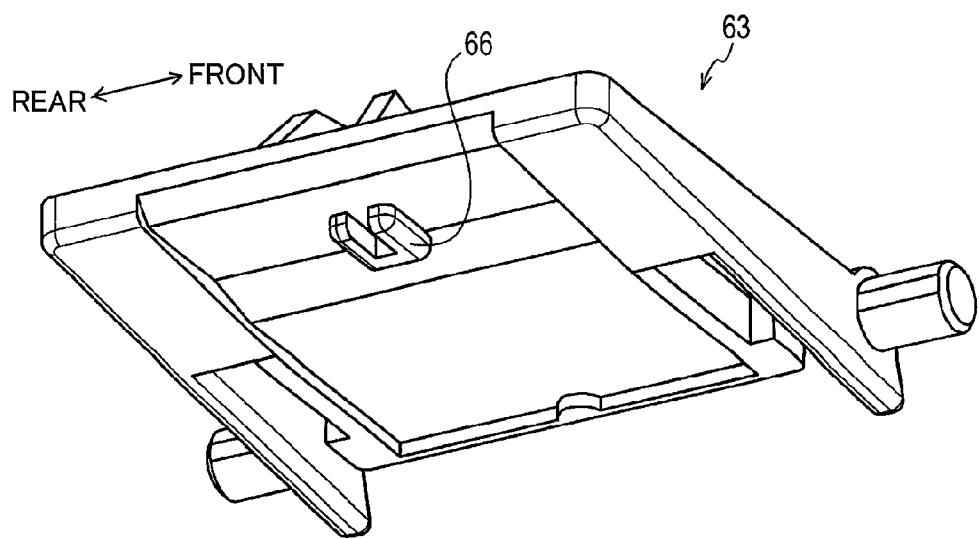
FIG. 6B is a perspective view illustrating the separating piece holder.

The separating piece holder 63 has a convex portion 66 protruding toward the separating piece 62 at a position overlapping with the separating piece 62. As illustrated in FIGS. 6A and 6B, the convex portion 66 abuts against the separating piece 62 at a widthwise (front-rear in the embodiment) center portion of the separating piece 62.

The convex portion 66 has a shape that is symmetric with respect to an imaginary vertical plane V2 (see FIG. 7A) passing through a position dividing the separating piece 62 into two equal parts in the widthwise direction. That is, the separating piece 62 also has a shape symmetric with respect to the imaginary vertical plane V2.

Accordingly, since the convex portion 66 has a symmetrical shape with respect to the imaginary vertical plane V2, the convex portion 66 abuts against the separating piece 62 at a position in alignment with the imaginary vertical plane V2.

In other words, the convex portion 66 abuts against the separating piece 62 such that an abutment area of the separating piece 62 where the convex portion 66 abuts against the separating piece 62 is positioned symmetrically with respect to the imaginary vertical plane V2.

In addition, the separating piece 62 contacts the document sheet at the widthwise (front-rear in the embodiment) center portion of the document sheet. Hence, the imaginary vertical plane V2 also passes through a position dividing the document sheet into two equal parts in the widthwise direction.

In other words, the convex position 66 has a length in the widthwise direction smaller than that of the separating piece 62. Hence, with respect to the widthwise direction, the separating piece 62 has the abutment area that abuts against the convex portion 66 and non-abutment areas that do not abut against the convex portion 66. The non-abutment areas are located on both sides of the abutment area in the widthwise direction. That is, the non-abutment areas are located on both front-rear sides of the abutment area. The non-abutment areas of the separating piece 62 are symmetrically positioned to each other with respect to the abutment area of the separating piece 62.

The convex portion 66 abuts against the separating piece 62 to bend the separating piece 62, thereby forming a portion 62A (see FIG. 6A). In other words, the separating piece 62 is bent at a position corresponding to the abutment area to provide the portion 62A that protrudes toward the separating roller 61 in a direction the same as the protruding direction of the convex portion 66. More specifically, as a result of abutment of the convex portion 66 against a surface of the separating piece 62 facing the convex portion 66, a surface of the separating piece 62 opposite to the surface of the separating piece 62 against which the convex portion 66 abuts is bent to protrude toward the separating roller 61.

Hereinafter, the portion 62A will be referred to as "protruding portion 62A". The separating piece 62 itself is formed of a resiliently deformable flat-plate shaped member. Abutment of the convex portion 66 against the separating piece 62 deforms the separating piece 62, thereby providing the protruding portion 62A.

In FIG. 5, a position where the document sheet(s) is nipped between the separating roller 61 and the separating piece 62 is referred to as a first nip position N1, and a position where the document sheet is nipped between the pair of conveying rollers 43A and 43B is referred to as a second nip position N2.

Incidentally, the position where the document sheet (sheets) is nipped between the separating roller 61 and the separating piece 62 (i.e. first nip position N1) extends in the widthwise direction (i.e. axial direction of the separating roller 61). Accordingly, the first nip position N1 can also be referred to as a first nip line. Similarly, the position where the document sheet is nipped between the pair of conveying rollers 43A and 43B (i.e. second nip position N2) extends in the widthwise direction (i.e. axial direction of the conveying rollers 43A, 43B). Accordingly, the second nip position N2 can also be referred to as a second nip line.

Further, an imaginary flat plane being defined by connecting the first nip position (first nip line) N1 and the second nip position (second nip line) N2 is referred to as an imaginary flat plane V.

The protruding portion 62A has a shape protruding toward the separating roller 61 beyond the imaginary flat plane V at a position downstream of the first nip position N1 in the conveyance direction. Further, as illustrated in FIG. 5, at a position downstream of the first nip position N1 in the conveyance direction, a first gap G1 is formed between the outer peripheral surface of the separating roller 61 and the separating piece 62. Further, as illustrated in FIGS. 7A and 7B, a second gap G2 is formed between the separating piece holder 63 and the separating piece 62 at a portion around the convex portion 66.

<Operational Effects>

According to the multifunction apparatus 1 with the above-described configuration, the separating piece 62 of the separating mechanism 42 has the protruding portion 62A. Hence, the conveyance resistance being applied to the document sheet by the separating piece 62 is not drastically reduced upon separation of the document sheet from the first nip position N1. This prevents the conveying speed of the document sheet from instantaneously increasing at a moment when the document sheet separates from the first nip position N1, compared to a conventional multifunction apparatus in which a portion corresponding to the protruding portion 62A is not provided. Accordingly, image reading quality can be enhanced.

Further, the protruding portion 62A is obtained by bending the flat-plate like separating piece 62 into a shape having a protruding portion toward the separating roller 61. Thus, in order to form the protruding portion 62A, the separating piece 62 itself is only required to be formed in a flat-plate like shape. This eliminates the need to provide a dedicated die for forming a shape of the separating piece 62 with the protruding portion 62A when manufacturing the separating piece 62. Hence, the separating piece 62 can be manufactured by using a simple method. For example, a punching process is used to cut off the separating piece 62 from a flat-plate shaped molded material. Accordingly, time and effort for manufacturing of the separating piece 62 can be reduced, thereby improving production efficiency of the ADF section 5 and reducing production cost thereof.

Further, the protruding portion 62A is obtained by making the convex portion 66 formed in the separating piece holder 63 abut against the separating piece 62, which eliminates the need to apply a bending process to the separating piece 62 and a process for maintaining the obtained bent shape.

Further, the separating piece 62 contacts the document sheet at the widthwise (front-rear in the embodiment) center portion of the document sheet, and the convex portion 66 abuts against the separating piece 62 at the widthwise (front-rear in the embodiment) center portion of the separating piece 62. Accordingly, the protruding portion 62A of the separating piece 62 contacts the document sheet at the widthwise (front-rear in the embodiment) center portion of the document sheet. In other words, since the convex portion 66 abuts against the separating piece 62 such that the abutment area of the separating piece 62 is symmetric with respect to the imaginary vertical plane V2, the protruding portion 62A of the separating piece 62 contacts the document sheet such that a contact area where the protruding portion 62A contacts the document sheet is symmetric with respect to the imaginary vertical plane V2.

Hence, the conveyance resistance to be applied to the document sheet by the separating piece 62 is applied to the document sheet equally with respect to the imaginary vertical plane V2. In other words, the separating piece 62 applies the conveyance resistance to the document sheet at a position equally distanced from both widthwise edges of the document sheet. Accordingly, occurrence of oblique passage (skew) of the document sheet can be reliably prevented.

Further, the first gap G1 prevents unnecessary conveyance resistance from being applied to the document sheet by the separating roller 61 while a certain amount of conveyance resistance is continuously applied to the document sheet by the separating piece 62 after the document sheet separates from the first nip position N1. Hence, unlike a configuration in which such a gap is not formed, excessive conveyance resistance is not applied to the document sheet by both the separating piece 62 and the separating roller 61. In addition, the second gap G2 allows a part of the separating piece 62 to escape in a direction in which the second gap G2 is narrowed when excessive force is applied from the document sheet toward the separating piece 62. Hence, unlike a configuration in which such a gap is not formed, a contact pressure between the separating piece 62 and the document sheet can be prevented from increasing excessively.

<Modifications>

Although the embodiment of the present invention has been described above, the present invention is not limited to the above specific embodiment. Various modifications are conceivable.

In the above-described embodiment, an automatic document feeder provided in an image reading apparatus is exemplified as the sheet conveying device. However, the present invention is applicable to a case where the sheet conveying device is configured as a recording medium conveying mechanism provided in an image forming apparatus. That is, adoption of the configuration in the present invention to the recording medium conveyance mechanism can prevent the conveying speed of a recording medium from increasing for an instant when the recording medium passes through the separating mechanism, thereby enhancing recording quality of an image to be formed on the recording medium.

Further, the multifunction apparatus 1 of the present embodiment is provided with various functions (print function, copy function, facsimile function, etc.) in addition to the function as the image reading apparatus (scan function). However, the number of functions to be implemented in the multifunction apparatus 1 can arbitrarily be determined. Further, even a single-function image scanner provided only with a function as an image reading apparatus can adopt the present invention.

While the present invention has been described in detail with reference to the embodiments thereof, it would be apparent to those skilled in the art that various changes and modifications may be made therein without departing from the spirit of the present invention.

What is claimed is:

1. A sheet conveying device configured to convey sheets in a conveyance direction along a predetermined conveying path, the sheet conveying device comprising:
   a separating roller having an outer peripheral surface and configured to convey each sheet along the predetermined conveying path in the conveyance direction;
   a separating piece configured to provide a first nip position in cooperation with the outer peripheral surface of the separating roller for nipping a sheet or sheets therebetween, the separating piece being configured to separate the sheets one by one in cooperation with the separating roller; and
   a pair of conveying rollers provided at a position downstream of the separating roller in the conveyance direction, the pair of conveying rollers being configured to provide a second nip position where the sheet is nipped therebetween for conveying the sheet conveyed by the separating roller in the conveyance direction, an imaginary flat plane being defined by connecting the first nip position and the second nip position,
   wherein the separating piece has a portion positioned downstream of the first nip position, the portion protruding toward the separating roller beyond the imaginary flat plane, and
   wherein the separating piece comprises a resiliently deformable flat0plate shaped member, the flat-plate shaped member being bent to form the portion of the separating piece,
   the sheet conveying device further comprising a separating piece holder provided at a position opposite to the separating roller with respect to the separating piece, the separating piece holder being configured to retain the separating piece and including a convex portion protruding toward the separating piece at a position overlapping with the separating piece, the convex portion abutting against the separating piece to provide the portion of the separating piece, the portion of the separating piece protruding in a direction the same as a direction in which the convex portion protrudes.

2. The sheet conveying device according to claim 1, wherein the sheet conveyed along the predetermined conveying path defines a widthwise direction, the sheet having a surface contactable with the outer peripheral surface of the separating roller when being conveyed, the widthwise direction being parallel to the surface and perpendicular to the conveyance direction,
   wherein the separating piece defines an imaginary vertical plane that divides the separating piece into two parts in the widthwise direction, one of the two parts having a shape symmetrical to a shape of the other of the two parts with respect to the imaginary vertical plane, and wherein the convex portion has a symmetrical shape with respect to the imaginary vertical plane, the convex portion abutting against the separating piece at a position in alignment with the imaginary vertical plane.

3. The sheet conveying device according to claim 2, wherein the convex portion abuts against the separating piece such that an abutment area of the separating piece where the convex portion abuts against the separating piece is located symmetrically with respect to the imaginary vertical plane.

4. The sheet conveying device according to claim 2, wherein the convex portion abuts against the separating piece at a center portion of the separating piece in the widthwise direction.

5. The sheet conveying device according to claim 1, wherein the separating roller and the separating piece provide a first gap between the outer peripheral surface of the separating roller and the separating piece at a position downstream of the first nip position in the conveyance direction.

6. The sheet conveying device according to claim 1, wherein the separating piece and the separating piece holder provide a second gap around the convex portion.

7. An image reading apparatus comprising:
a sheet conveying unit configured to convey sheets in a conveyance direction along a predetermined conveying path; and
a reading unit configured to read an image from a sheet conveyed by the sheet conveying unit;
the sheet conveying unit comprising:
a separating roller having an outer peripheral surface and configured to convey each sheet along the predetermined conveying path in the conveyance direction;
a separating piece configured to provide a first nip position in cooperation with the outer peripheral surface of the separating roller for nipping a sheet or sheets therebetween, the separating piece being configured to separate the sheets one by one in cooperation with the separating roller; and
a pair of conveying rollers provided at a position downstream of the separating roller in the conveyance direction, the pair of conveying rollers being configured to provide a second nip position where the sheet is nipped therebetween for conveying the sheet conveyed by the separating roller in the conveyance direction, an imaginary flat plane being defined by connecting the first nip position and the second nip position,
wherein the separating piece has a portion positioned downstream of the first nip position, the portion protruding toward the separating roller beyond the imaginary flat plane, and
wherein the separating piece comprises a resiliently deformable flat-plate shaped member, the flat-plate shaped member being bent to form the portion of the separating piece, the sheet conveying device further comprising a separating piece holder provided at a position opposite to the separating roller with respect to the separating piece, the separating piece holder being configured to retain the separating piece and including a convex portion protruding toward the separating piece at a position overlapping with the separating piece, the convex portion abutting against the separating piece to provide the portion of the separating piece, the portion of the separating piece protruding in a direction the same as a direction in which the convex portion protrudes.

8. A sheet conveying device configured to convey sheets in a conveyance direction along a predetermined conveying path, the sheet conveying device comprising:
a separating roller having an outer peripheral surface and a rotation axis oriented in an axial direction perpendicular to the conveyance direction, the separating roller being configured to convey each sheet along the predetermined conveying path in the conveyance direction;
a separating piece configured to provide a nip position in cooperation with the outer peripheral surface of the separating roller for nipping a sheet or sheets therebetween, the separating piece being configured to separate the sheets one by one in cooperation with the separating roller, the separating piece having a first end portion and a second end portion opposite to and downstream of the first end portion in the conveyance direction; and
a separating piece holder provided at a position opposite to the separating roller with respect to the separating piece and configured to retain the separating piece, the separating piece holder including:
a first flat portion positioned upstream relative to the nip position in the conveyance direction and configured to support the first end portion of the separating piece; and
a convex portion positioned downstream relative to the nip position in the conveyance direction and at a center region of the separating piece holder in the axial direction, the convex portion protruding toward the separating roller further than the first flat portion, the convex portion being configured to abut against the second end portion of the separating piece.

9. The sheet conveying device according to claim 8, wherein the separating piece holder further includes a second flat portion positioned downstream of the first flat portion in the conveyance direction, the second flat portion being arranged farther away from the separating roller than the first flat portion from the separating roller, the convex portion being provided at the second flat portion.

10. The sheet conveying device according to claim 8, wherein the separating piece holder is configured to retain the separating piece such that a center in the axial direction of the separating piece is aligned with a center in the axial direction of the separating piece holder.

* * * * *

UNITED STATES PATENT AND TRADEMARK OFFICE
CERTIFICATE OF CORRECTION

PATENT NO. : 9,025,221 B2  Page 1 of 1
APPLICATION NO. : 14/227609
DATED : May 5, 2015
INVENTOR(S) : Yoshinori Osakabe et al.

It is certified that error appears in the above-identified patent and that said Letters Patent is hereby corrected as shown below:

In the claims
Column 12, Claim 1, Line 45:
   Please delete "flat0plate" and insert --flat-plate--

Signed and Sealed this
First Day of December, 2015

Michelle K. Lee
*Director of the United States Patent and Trademark Office*